(12) United States Patent
Craessaerts et al.

(10) Patent No.: US 7,976,369 B2
(45) Date of Patent: Jul. 12, 2011

(54) BIOMASS CLEANER WITH IMPROVEMENTS IN CROP HARVESTING MACHINES AND RELATED METHODS

(75) Inventors: Geert J. Craessaerts, Leuven (BE); Bart M. A. Missotten, Winksele (BE)

(73) Assignee: CNH America LLC, New Holland, PA (US)

( * ) Notice: Subject to any disclaimer, the term of this patent is extended or adjusted under 35 U.S.C. 154(b) by 336 days.

(21) Appl. No.: 12/221,017

(22) Filed: Jul. 30, 2008

(65) Prior Publication Data

US 2009/0036184 A1    Feb. 5, 2009

(30) Foreign Application Priority Data

Aug. 1, 2007    (GB) .................................. 0714942.0

(51) Int. Cl.
    *A01F 21/00*    (2006.01)
(52) U.S. Cl. ............................................. 460/6
(58) Field of Classification Search .............. 460/1, 4–6, 460/97, 99–102, 902
    See application file for complete search history.

(56) References Cited

U.S. PATENT DOCUMENTS

| | | | | |
|---|---|---|---|---|
| 4,259,829 A | * | 4/1981 | Strubbe | 460/5 |
| 4,466,230 A | * | 8/1984 | Osselaere et al. | 460/5 |
| 4,751,501 A | * | 6/1988 | Gut | 340/607 |
| 4,897,071 A | * | 1/1990 | Desnijder et al. | 460/10 |
| 6,119,442 A | * | 9/2000 | Hale | 56/10.2 H |
| 6,591,145 B1 | * | 7/2003 | Hoskinson et al. | 700/28 |
| 6,761,630 B1 | * | 7/2004 | Schwinn et al. | 460/101 |
| 6,860,805 B2 | * | 3/2005 | Kuhn et al. | 460/111 |
| 6,863,604 B2 | * | 3/2005 | Behnke | 460/6 |
| 2003/0190939 A1 | * | 10/2003 | Bueermann | 460/111 |
| 2005/0245300 A1 | * | 11/2005 | Maertens et al. | 460/59 |
| 2006/0246966 A1 | * | 11/2006 | Smith | 460/112 |
| 2006/0272307 A1 | | 12/2006 | Behnke et al. | |

FOREIGN PATENT DOCUMENTS

GB    1261235 A    1/1972

* cited by examiner

*Primary Examiner* — Thomas B Will
*Assistant Examiner* — Mai Nguyen
(74) *Attorney, Agent, or Firm* — Michael G. Harms; Patrick M. Sheldrake

(57) ABSTRACT

A biomass cleaner, of a harvesting machine, includes at least a first sieve for sieving biomass and having one or more first sieve apertures that are openable and closeable in dependence on control commands. The biomass cleaner also includes an air fan, the speed of which is adjustable in dependence on control commands. The biomass cleaner has one or more control devices that generate the control commands. The first sieve defines a support for biomass that is sieveable via the sieve, and the biomass cleaner includes one or more pressure sensors for generating one or more signals that are related to the pressure of air in the vicinity of the biomass. At least one pressure sensor is operatively connected to supply the signals to a control device that derives therefrom further estimates of the sieve losses and/or the MOG content of the biomass, as defined herein, during operation thereof.

27 Claims, 4 Drawing Sheets

BIOMASS CLEANER WITH IMPROVEMENTS IN CROP HARVESTING MACHINES AND RELATED METHODS

CROSS REFERENCE TO RELATED APPLICATIONS

This Patent Application claims priority under 35 U.S.C. §119 to GB0714942.0, filed on Aug. 1, 2007 titled, "A Biomass Cleaner; Improvements in Crop Harvesting Machines and Related Methods" and having Geert J. Craessaerts and Bart M.A. Missotten as inventors. The full disclosure of GB0714942.0 is hereby fully incorporated herein by reference.

This invention relates to a biomass cleaner and especially a biomass cleaner for a harvesting machine. The invention also concerns improvements in a crop harvesting machine; and the use of such a crop harvesting machine in the harvesting of crop.

It is generally desired, in an automated, self-powered crop harvesting machine to carry out at least some degree of cleaning of the harvested crop within the machine while harvesting operations are taking place.

Cleaning of the crop in this fashion has been desirable since the earliest days of mechanised farming. This is not least because many of the waste products of a harvesting operation are most efficiently dealt with at the location in which the crop grows. Also it is very common for the price paid for harvested crop to be related to the quantity (typically the mass) of crop sold. The calculation of the price of a batch of crop requires that the batch in question is as free as possible from contaminants.

To this end many harvesting machines include sections (referred to generally herein as "biomass cleaners") whose purpose is to clean contaminants from the harvested crop. This is especially true in the case of a combine harvester that is intended, as is well known, to harvest grains of cereals such as wheat, barley, and oats, and other granular crops such as canola.

The invention therefore is particularly useful in the grain cleaning section of a combine harvester, although it is not limited to such applications. On the contrary the invention is useable in many other instances in which it is desired to clean biomass in a cleaner.

Commonly, when referring to material processed by a combine harvester, the terms "grain", "straw", and "tailings" are used. The terms "chaff" and "broken grains" are also relevant to the invention disclosed herein.

These terms are not limiting.

"Grain" refers to the useful part of the crop which is threshed and separated from the discardable part of the crop material. The latter is referred to as MOG (Material Other than Grain), predominantly comprising "straw" and "chaff" (plus, from time to time, other particle types as described herein).

Incompletely threshed ears are referred to as "tailings".

The grain cleaning section of a combine harvester typically includes a pair of rectangular sieves located one beneath the other inside the harvesting machine beneath the threshing section.

The sieves each typically include rows of hingedly mounted louvres the angles of which are adjustable so as to adjust the sizes of elongate apertures in the sieves.

The sieves are mounted to pivot arms for back-and-forth oscillation in order to convey the material resting thereon rearwardly.

A fan typically is provided to create air pressure in the cleaning section. In use of the cleaning section grain mixed with MOG (i.e. contaminants of the kind that the cleaner is intended to eliminate) such as leaf and stem parts (straw and chaff as aforesaid), dirt, dust and small stones, is fed so as to lie on the upper of the two sieves. The grain and MOG fall onto the upper sieve from the threshing and separating sections of the combine harvester.

The opening of the apertures of the upper sieve may be set at a sufficiently large gap that only comparatively large particles (e.g. pieces of straw) remain on it, and the grains mixed with tailings and smaller particles of MOG pass through it. The grains, tailings and smaller MOG particles fall onto the lower sieve the louvres of which during normal operation of the combine harvester are set to define smaller openings than the louvres of the upper sieve.

As the process of grains, tailings and MOG passing through the upper sieve progresses, comparatively light MOG pieces (predominantly constituted by chaff and by lengths of straw) remaining afloat above or resting on the upper sieve are blown by the fan off the sieve for further processing as required and eventual ejection from the rear of the combine harvester onto the ground.

The louvres of the lower sieve normally define smaller apertures than the upper sieve louvres. The fan also provides a constant air stream through this lower sieve. As a result the heavier grains pass through the lower sieve, but the lighter MOG particles are blown off the sieve and to the rear of the combine harvester where they are mixed with the MOG pieces from the upper sieve. The grains are collected below the sieves and may then be conveyed using various mechanisms to the clean grain tank of the combine harvester.

The oscillating sieve conveys the larger tailings to its rear end, from where these are guided along one or two return flow paths, comprising a rethreshing unit, to the front of the cleaning system.

The terms "forward", "rearward", "upper", "lower", "left", "right", etc when used in connection with a combine harvester and/or components thereof are determined with reference to the combine harvester in its normal operational condition and may refer either to the direction of forward operative travel of the combine harvester or to the direction of normal material flow through components thereof. Such terms should not be construed as limiting.

It is possible to identify different return flow measurements depending on whether one is assessing the return flow in the left-hand side or the right-hand side return retain flow path for grains that either are incompletely threshed during a first pass through the machine or are recovered after having been lost from the main grain flow path.

Similarly, it is possible to identify left and right-hand side air pressure measurements in the exhaust of the combine harvester fan.

For many years combine harvesters have included electrical controls, in the operator's cabin, the purpose of which is to permit adjustment of the openings in the sieves as determined by the louvre angles; and the speed of the fan.

The interaction between the effects of varying the louvre settings and the fan speed is highly complex and very much dependent on the amount and composition of the crop material provided to the cleaning system. Often it is not possible to say with complete certainty what the influence of any particular combination of settings may be. However it is known for example that setting the opening of the lower sieve at too large a value can lead to an unclean grain sample in the grain tank as MOG tends to pass with the grain through the lower sieve.

Unclean grain samples are unacceptable since they have a serious effect on the price paid for the harvested grain.

If on the other hand the lower sieve opening is too small this can lead to an excess return flow, which causes a higher proportion of the grain to be rethreshed, which results in a higher percentage of broken kernels in the grain fed from the cleaning section of the combine harvester to the clean grain tank.

One of the most serious problems that can arise in the grain cleaning section is partial or even complete plugging of the top sieve (resulting typically from a combination of incorrect sieve aperture and fan speed settings). Even if this condition does not cause a complete interruption of the harvesting process it can lead to very high "sieve losses" since the oscillating sieve and the fan convey large amounts of grain lying on the upper sieve to the rear into the MOG reject path of the combine harvester.

Overall there is a very delicate balance between the sieve louvre settings and the fan speed, and the optimal combination of settings varies significantly according to the harvesting conditions.

The foregoing problems can arise as a result of ill-informed or insufficiently frequent use of the cabin controls by a combine harvester operator. In this regard it is commonplace for an operator either to react too slowly to changing field conditions (such as an increase in crop density) or to base adjustment decisions on guesses about the condition in the grain cleaning section. Such an approach to adjustment is prevalent even when the grain path in the combine harvester is monitored by a camera that produces a visible display in the operator's cabin.

The prior art approach to adjusting the fan and louvre settings therefore is severely adverse to the economics of farming.

It has been observed in relation to combine harvesters in use in Germany (as an example) that if total losses could be diminished up to 5%, this would offer an increase in turnover of $20,000 for each combine harvester, each year.

According to estimates, only 45% of the maximum performance of the current combine harvesters is reached because a combine driver has to deal with significant time pressures. A combine driver gives special attention to the direction and speed of the combine and the height of the header and little or no attention to the internal processes, like threshing and cleaning. On the contrary, generally the settings are estimated only once for each field and the whole field is harvested with these settings. Because of this, differences in temporal—and place—specific conditions are neglected. As a result, manual control of the harvester will never lead to a maximal exploitation of the combine capacity.

It follows from the foregoing that there is a need for improvements in the control of biomass cleaners, especially when used in combine harvesters.

A paper "*Regelkonzepte für die Mähdrescher—Reinigungsanlage*" (Kolloquium Landtechnik, 25/26 Apr. 1988) discloses that the pressure of air in the grain cleaning section of a combine harvester is related to the loading on the grain cleaning section. This paper however fails to explain in a genuinely practical way how this relationship may be exploited in order to improve the efficiency of harvesting operations. Thus there remains a need to devise a control arrangement for a biomass cleaner (especially the grain cleaner of a combine harvester) that takes account of the complex interrelationships, described above, concerning the settings of adjustable components.

According to the invention in a broad aspect there is provided a biomass cleaner, of a harvesting machine, comprising at least a first sieve for sieving biomass and having one or more first sieve apertures that are openable and closeable in dependence on control commands; an air fan the speed of which is adjustable in dependence on control commands; and one or more control devices that generate the said control commands, the first sieve defining a support for biomass that is sieveable via the sieve; and the biomass cleaner including one or more pressure sensors for generating one or more signals that are related to the pressure of air in the vicinity of the biomass, characterised in that the or each pressure sensor is operatively connected to supply the said signals to a control device that derives therefrom further sieve load signals indicative of the amount of biomass on the first sieve and derives from said sieve load signals estimates of the sieve losses and/or the MOG content of the cleaned biomass, as defined herein, during operation of the cleaner.

In this regard it has hitherto not been realised that by generating from measured pressure signals both MOG content and sieve loss estimates it is possible to create a fast and accurate control arrangement that significantly improves the efficiency of the biomass cleaning process. Experiments however have verified that improvements arise from the use of a biomass cleaner as defined above.

In a practical, preferred embodiment of the invention a said pressure sensor in use lies below the first sieve. More preferably the first sieve is rectangular in plan view and the pressure sensor lies adjacent a corner thereof. In an even more preferred arrangement such a pressure sensor is located at each corner of the rectangular first sieve. Such arrangements are well suited for use in a combine harvester, which as indicated represents the preferred application of the biomass cleaner of the invention.

Conveniently the or a said control device generates control commands for adjusting the degree of opening of the first sieve apertures in dependence on the estimates of the sieve losses and/or the estimates of the MOG content of the cleaned biomass. Such a configuration represents a practical set-up that takes advantage of the presence, in a typical combine harvester, of processing devices and motorised adjusters for the louvres of the first sieve.

It is also preferable that the processing device causes the or a said control device to generate control commands for adjusting the speed of the fan in dependence on the estimates of the sieve losses and/or the signals indicative of the MOG content of the biomass. Thus in a manner similar to the louvre adjustment feature described above the biomass cleaner of the invention may provide for accurate control of the fan speed (that may, in accordance with use of the apparatus of the invention, be integrated with the louvre settings in a way that minimises grain losses and also minimises the MOG content in the grain that passes to e.g. a clean grain tank).

Preferably the biomass cleaner includes a further sieve having one or more further sieve apertures that are openable and closeable in dependence on further control commands, the further sieve being located to sieve biomass that is ejected from the first sieve; and the biomass cleaner including one or more control devices that generate the said further control commands and are operatively connected to do so. Also preferably in use the further sieve lies below the first sieve such that during sieving biomass falls under gravity from the first sieve to the further sieve. Thus the biomass cleaner of the invention may be configured in a way that is suited to the grain cleaner layout of a typical, modern combine harvester.

In more detail, a sensor may provide a static air pressure signal and another sensor a dynamic air pressure signal. Then preferably the or each said control device is programmable and one or more said devices are programmed to determine the difference between the static air pressure and the dynamic air pressure in the biomass cleaner and produce a difference signal that is related to the said difference. It has advantageously been found that programming a control device to perform such a calculation beneficially permits the use of control laws that are robust notwithstanding the rapidly changing conditions in the grain cleaner of a combine harvester.

In this regard, it has conveniently been found that during use of a combine harvester as the loading of the cleaning mechanism increases the static air pressure increases while at the same time the air velocity drops such that the dynamic air pressure decreases. Therefore a signal that is indicative of the difference between static and dynamic air pressure in or adjacent to the exit of the cleaning mechanism is an indicator of the quantity of material in such mechanisms. Moreover it has been found that this difference (between the static and dynamic pressure values) is related to the amount of MOG in the cleaned biomass and to the sieve losses in the cleaning mechanism. Thus a sensing arrangement that detects the difference between static and dynamic pressure values in the vicinity of the cleaning mechanism is particularly useful for establishing whether an internal process control mechanism of a combine harvester is effective.

Preferably the or each said control device is programmed to compare the pressure sensor signal with a range of pressures corresponding to first sieve aperture opening values, to determine therefrom a first sieve opening equivalence; and to establish the difference between the degree of opening of the or each first sieve aperture on the one hand and the first sieve opening equivalence on the other, one or more said control devices deriving the sieve load signals from the said difference. In practice in this regard one or more of the control devices includes a memory having stored therein one or more calibration data sets that are characteristic of the biomass cleaner and include plural values of first sieve opening equivalence; and wherein one or more of the control devices is programmed to generate the sieve load signal by comparison with one or more said calibration data set.

Consequently the data needed for calibrating the measured pressure signals so as to take account of prevailing settings in the biomass cleaner may advantageously be stored as e.g. a chart or lookup table.

Preferably one or more of the control devices define two control loops a first of which is a relatively fast control loop that controls the adjustment of the speed of the air fan; and the second of which is a relatively slow control loop that controls the degree of opening of at least the first sieve apertures.

Such an arrangement conveniently takes advantage of the fact that the effects of adjusting a fan speed setting on MOG content and sieve loss arise more rapidly, in a typical combine harvester, than the effects of adjusting a louvre openings.

In a practical embodiment of the invention the second, relatively slow control loop additionally controls the degree of opening of the or each further sieve aperture.

Overall it is an advantage of the invention to permit a control philosophy that is based on optimising (typically but not necessarily maximising) the throughput of crop through the harvesting machine.

One form of control law that advantageously may be programmed or otherwise provided in accordance with the invention is one in which the relatively fast control loop is or includes a feedback loop the gain expression of which is non-linear and that relates the sieve load signal, an instantaneously prevailing value of the MOG content of the biomass and an instantaneously prevailing value of the sieve losses in the biomass cleaner. The gain term preferably is established experimentally so as to suit the precise biomass cleaner under consideration.

In one preferred embodiment of the invention one or more of the control devices is/are programmed to operate the fast control loop when the corrected pressure signal lies outside a predetermined range of values. This permits the biomass cleaner to respond rapidly for example when a MOG and/or sieve loss value calculated as defined hereinabove moves rapidly away from a set point (as may occur when the density of crop harvested by a combine harvester changes unexpectedly).

For the foregoing reason it is also preferable that the second, relatively slow control loop is or includes a linear feedback loop the set points of which are predetermined values of the MOG content of the biomass and of the sieve losses in the biomass cleaner.

Preferably one or more of the control devices is programmed to include a recursive estimator relating values of the sieve load signal, the value of the MOG content of the biomass and the value of sieve losses in the biomass cleaner.

As indicated herein the most preferred embodiment of the invention is one in which the biomass cleaner is configured as the grain cleaner of a combine harvester.

The invention is also considered to reside in the use of a biomass cleaner, as defined, in the cleaning of biomass; and to methods of cleaning biomass as disclosed herein. In particular the invention relates to methods of operating a biomass cleaner as defined.

A control philosophy based on assessments of the quality of the material passing through the crop cleaning mechanism may rely, in accordance with the invention, on evaluations of the proportion of MOG in the cleaned crop; or on the proportion of grains "lost" by the cleaning system (i.e. not conveyed to the grain tank or to the rethreshing system, but deposited on the field behind the machine).

In practice the air pressure measurements that are input variables to any control philosophy according to the invention are selected from a group of variables, according to a multivariate statistical selection process that typically would take place before a harvesting operation commences, and more precisely during the stage of designing and testing the harvesting machine.

The method disclosed herein includes the step of adjusting one or more of an engine governor member or setting of a hydraulic pump that controls the ground speed of the harvesting machine; the degree of opening of the said upper sieve; the degree of opening of the said lower sieve; and/or adjustment of the rotational speed of the fan. Such adjustments may in accordance with the invention take place in order to achieve a desired quantity and/or quality of material in the cleaning mechanism.

The air pressure sensors mentioned above may in preferred embodiments of the invention be pitot tube sensors or hot-wire anemometers. Combinations of such sensor types are possible in the combine harvester according to the invention. Other sensor types are also possible.

Furthermore it is preferable that the or each pressure sensor includes a transducer element that is operatively connected one or more of the control devices of the biomass cleaner; and a tube that is operatively connected to the transducer element, the tube being open at an opening that is spaced from the transducer element.

It is believed that a tube, forming part of the pressure sensor, having an open end that opens facing into the direction of flow of material in the cleaning mechanism would provide accurate indications of the air pressure levels in such mechanisms. Such a tube however would be prone to clogging as a result of the flow of material. Therefore a tube having an opening that faces away from the air and material flowing through the cleaning mechanism is preferred for practical reasons.

Thus the opening in preferred embodiments of the invention faces away from an in-use upstream end of the cleaning mechanism. To this end therefore the tube preferably bends through approximately 90° from one end to the other.

In an alternative arrangement, the tube extends generally parallel to a louvre of a sieve of the cleaning mechanism. The tube may be incorporated into a louvre of the sieve. In such an arrangement the tube may have one or more openings extending along its length, the openings being orientated in accordance with the foregoing principles so as to minimise or eliminate the chance of clogging of the tube during use of the combine harvester.

In a further aspect the invention relates to a crop harvesting machine, e.g. a combine harvester, including a biomass cleaner as defined hereinabove.

The crop harvesting machine also may preferably include a sensor for sensing MOG and/or sieve losses as defined, whereby it becomes possible to generate a feedback signal that is indicative of the efficacy of operation of a method carried out by the combine harvester.

When the invention forms part of a crop harvesting machine the latter may include one or more air velocity sensors located at one or more of:
 a top outlet of a cleaning mechanism fan;
 a bottom outlet of a cleaning mechanism fan;
 under one or more sieve areas of the cleaning mechanism; or
 adjacent a tailings conveyor of the combine harvester,
the or each said air velocity sensor being capable of generating one or more signals that are each indicative of the velocity of air in its vicinity and being operatively connected to one or more of the control devices.

It is also preferable that the crop harvesting machine includes one or more load cells each operatively secured to a grain pan of the combine harvester, the or each load cell being capable of generating one or more signals that are each indicative of the instantaneously prevailing load of grain on an the associated grain pan during operation of the harvesting machine; the or each load cell being operatively connected to a said control device; and the control device being capable of deriving a sieve loss and/or MOG estimate from the or each load cell signal.

Yet a further, optional feature of the invention is the inclusion in the crop harvesting machine of a grain flow sensor located and configured to generate one or more signals that are each indicative of the proportion of returned grain at a tailings conveyor or at another location in the crop harvesting machine, the grain flow sensor being operatively connected to the control device. This grain flow sensor may be a grain impact sensor of the type used in conventional grain loss sensors.

The above-described sensor types are particularly suited to operation of the harvesting machine of the invention in accordance with the method disclosed herein.

There now follows a description of preferred embodiments of the invention, by way of non-limiting example, with reference being made to the accompanying drawings in which.

Figure 1:
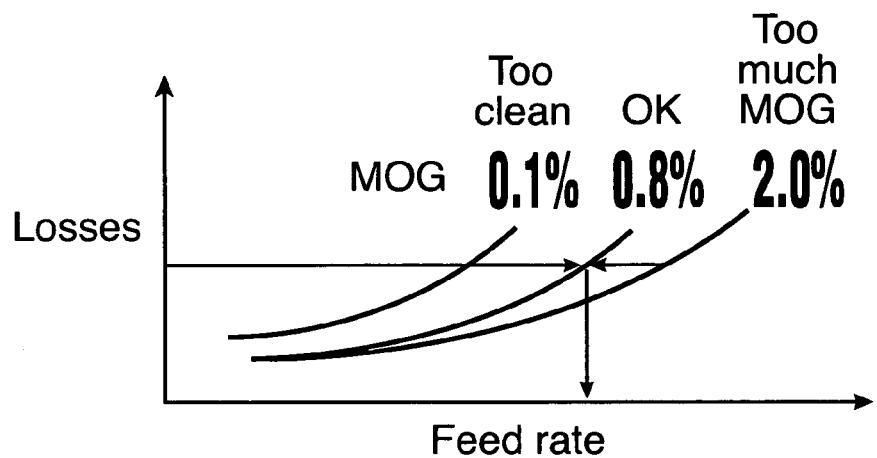
FIG. 1 is a schematic representation of optimisation of the amount of MOG in the cleaning section of a combine harvester for a given grain loss ratio.

FIG. 1 hereof shows plots of grain loss in a combine harvester against the total feed rate of crop ingested during harvesting operations for three MOG content ratios. FIG. 1 shows that there is a relationship between these quantities. It follows from this that it is possible to control the internal processes of a harvesting machine using measurements of grain losses and MOG content as a way of optimising the machine performance. In this regard, too high a feed rate results in unacceptable losses and MOG content; whereas minimisation of the losses or the MOG content results in an uneconomic feed rate. Therefore a control philosophy that seeks to optimise the cleaning system, with reference to a predetermined MOG content and grain loss rate associated with a maximal feed rate, is likely to be successful.

In the examples shown, an acceptable compromise for the MOG content is represented by a MOG figure of 0.8% (as contrasted with a minimum of 0.1% achieveable in the combine harvester; and a maximum of 2% when the combine harvester is moving at a maximum speed in a harvesting operation).

As is commonplace nowadays, a typical combine harvester includes a large number of sensors located at various positions in the crop flow path between the header bar and the grain chute. These are used for various purposes. If however each one of them were to be an input to a control module numerous potential disadvantages could arise.

The main one of these is based on the thus resulting need for increased processing complexity in order to handle the large number of inputs.

Furthermore, reliance on a large number of inputs could skew the output of the control model since not all of the variables sensed in a combine harvester are likely to contribute strongly to the output of a grain loss or MOG content control model. Therefore there is a need to rationalise the large group of variables to a set that is firstly manageable in computing terms within the cost and processor constraints in a moveable vehicle such as a combine harvester; and secondly composed of variables that are the most strongly influential on the output of the control model.

During development of the invention a multi-variate statistical selection process was used (and in particular genetic polynomial regression techniques) in order to establish the set of variables.

A summary of the possible group of variables in a typical combine harvester, and the sensors which measure them, is:

Machine speed: The rotation speed of the driving wheels is commonly used to estimate ground speed.

Feedrate: A sensor measures the driving torque of the header as a measure of the total crop flow into the harvester.

Drum torque: A sensor measures the driving torque of the threshing drum.

Engine load: This variable is estimated by measuring the instantaneous fuel consumption.

Lower and upper sieve opening: Potentiometers monitor the position of the sieve opening motors Grain mass flow: A grain mass flow sensor is installed at the end of the clean grain elevator, just before the grain tank.

Moisture: A capacitive sensor measures the moisture content of the grain flow in the clean grain elevator.

Lateral and longitudinal inclination: Two inclinometers are installed at the bottom of the machine Fan speed: The rotation speed of the cleaning fan can manually be adjusted by the combine driver and is measured by an rpm sensor.

Pressure sensors: Two pitot pressure tubes and two hot-wire anemometers are secured near the exhaust of the cleaning fan. Four other pressure sensors are connected to tubes below the corner sections of the upper sieve. The tubes have rearwardly extending holes as described below.

Grain pan load: a sensor measuring the crop load on the grain pan according to the principle described in De Baerdemaeker, et al., "*Measuring the material flowrate on the preparation table of a combine*", ASAE meeting paper, Louisiana. 1989-1591.

Return grain flow: Some of the grain and chaff flow falls through the upper sieve but does not pass through the bottom sieve. A pair of augers at the bottom of the grain cleaner transport this material which consists of unthreshed ears, short straw, chaff and grain kernels towards both sides of the machine where it is rethreshed by two roto-threshers. The output of these small threshing units is again transported to the grain pan via fast rotating return augers 18 and ejected by two impellers against a flap installed above the grain pan. On this flap, two impact sensors are installed to detect the quantity of grain kernels in the return flow. These impact sensors are of the same type as the grain loss sensors at the rear of the harvester.

Return flow: The flow rate of the return flow is measured by a mass flow sensor according to EP 0 463 240 A1.

Sieve losses: Sieve losses are measured by an impact sensor of the type described in EP 0 339 142 A1, which consists of a metal plate with a piezo-electric sensor installed at the end of the sieve section to estimate the quantity of residual grain kernels between the straw particles. A combination of three sieve loss sensors is preferred, with each located at the end of the sieve section, although other numbers and combinations of sensors are possible within the scope of the invention.

MOG content: The percentage of MOG particles in the crop fed to the grain tank is established by a sensor mounted on the clean grain elevator. This apparatus is of the type described in WO 2006/010761 A1 and processes images of the crop for distinguishing between grains and MOG particles.

A number of approaches exist to the selection of the set of variables from the larger group. These include all-possible regression procedures; backward regression selection; stepwise regression selection; and/or genetic polynomial regression techniques. These various techniques are all potentially relevant to the selection of controller input variables in crop a harvesting machine. Since they are known per se they will not be described in detail herein.

As a result of selection according to such techniques it was established that the group of variables of greatest use in the grain cleaner is the following set:

the intake load (crop feedrate);
the degree of opening of an upper sieve of the crop cleaning mechanism;
the degree of opening of a lower sieve of the crop cleaning mechanism;
the rotational speed of a fan in the crop cleaning mechanism;
grain content in the return flow.

The steps of selecting the set of variables took place during the design and/or testing stage of the construction of a particular combine harvester.

Of course in a different harvesting machine, the set of preferred variables may (for a variety of reasons) differ. Moreover it is not essential that the set consists of only five variable reference inputs. A different number may be appropriate in a different installation. All such variations are of course within the scope of the invention.

Regardless of the precise choice of the set of variables, these may in accordance with the method of the invention be inputs to a fuzzy model of the kind specified herein that is programmed into software contained e.g. in a computer located on-board within the harvesting machine.

Figure 6:
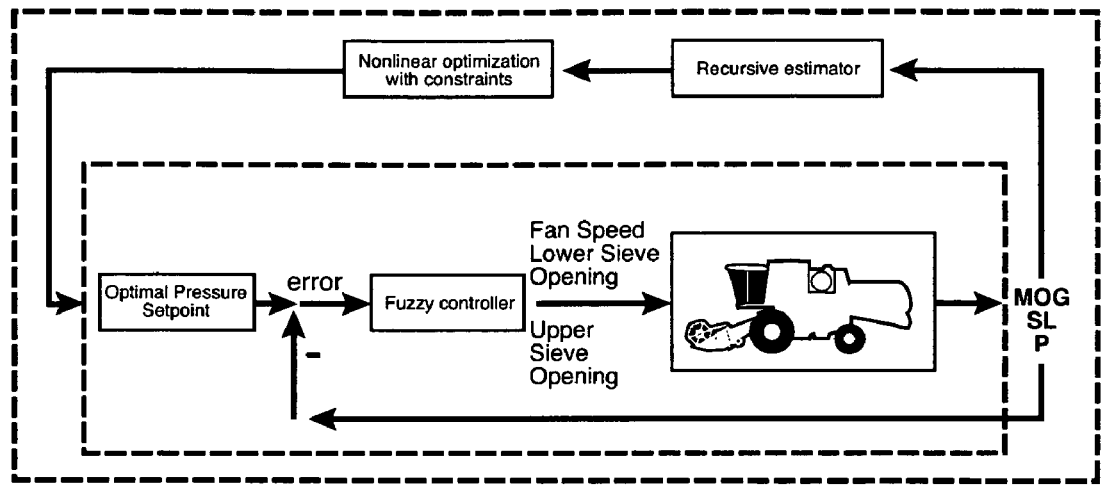
FIG. 6 shows in a schematic fashion a control scheme, of a combine harvester, according to the principles of the invention.

Such a model is shown in FIG. 6. The model is described in greater detail below.

Figure 2A:
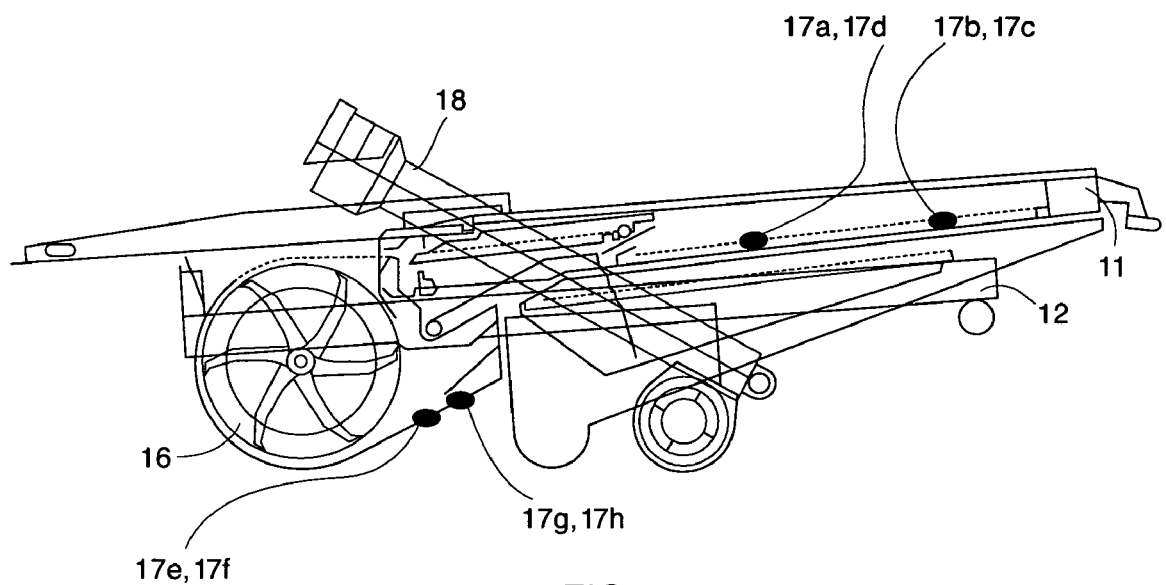
FIGS. 2A and 2B show a biomass cleaner, in accordance with the invention, in the form of the grain cleaner of a combine harvester.

The model of FIG. 6 relates to one particular kind of biomass cleaner, that is shown in FIG. 2. This biomass cleaner takes the form of a grain cleaner 10 of a combine harvester that comprises upper 11 and lower 12 sieves (FIG. 2A).

Figure 2B:
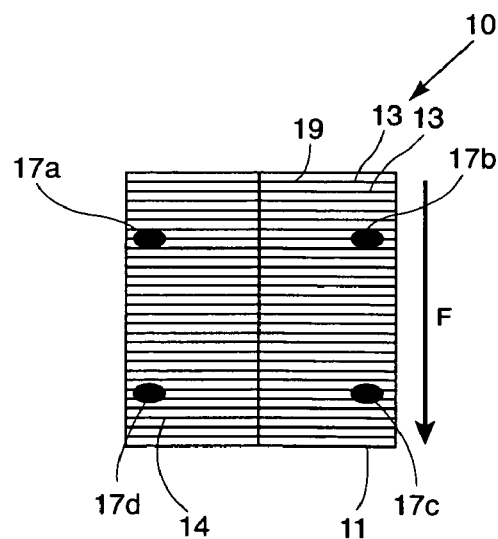

As best shown in FIG. 2B, which depicts the upper sieve 11 in plan view, the sieves 11, 12 are generally of conventional design (subject to the modifications indicated below). As regards the basic features of a per se known grain cleaner sieve, FIG. 2B is representative of both the upper and lower sieves 11, 12. On the other hand the placing of pressure sensors as discussed below is described herein with reference to the upper sieve 11 only since the preferred embodiment of the invention the lower sieve 12 omits pressure sensors.

Each sieve 11, 12 includes a plurality of sieve apertures 13. In the preferred embodiment these are defined by louvres 14 of a generally known kind. The louvres 14 are openable and closeable in dependence on control commands that drive motors (that again are well known in the art) for changing the angle of orientation of the louvres 14.

To this end the louvres are pivotally mounted and are linked to a control bar that is connected to the drive motor so that they are adjustable in unison. As a consequence all the sieve apertures of the respective upper or lower sieve 11, 12 may be set to the same opening.

An air fan 16 is located in a position in front of the sieves 11, 12 that is conventional for such a device in the grain cleaner of a combine harvester. The purpose of the fan 16 is to generate a stream of air (and hence increase the air pressure in the vicinity of grain cleaner 10 within the combine harvester) primarily for the purpose of blowing MOG away from the grain on the upper sieve 11 and discharging it at the rear of the harvester.

Since the combine harvester must operate to harvest a wide variety of crop types, under various conditions and at various crop densities, the speed of the fan is adjustable. This is achieved through the use of control commands generated by a control device such as one of the several microprocessors nowadays typically found in a combine harvester.

The microprocessors are not shown in FIG. 2, but they are wired in a conventional manner (or may be connected wirelessly according to any of a number of suitable protocols) so as to provide control commands for the adjustable parts of the grain cleaner 10.

Basic operation of a combine harvester grain cleaner such as grain cleaner 10 is described hereinabove.

The upper sieve 11 may be regarded as a first sieve that defines a support for biomass (the biomass not being shown in FIG. 2). The nature of the biomass handled via a combine harvester grain cleaner will be well known to the worker of skill in the art.

The biomass cleaner 10 includes a plurality of pressure sensors 17 that generate plural signals related to the pressure of air in the vicinity of the biomass. In the embodiment of the invention shown in the drawings, four pressure sensors 17a, 17b, 17c, 17d are located respectively adjacent the corners of the upper (first) sieve 11, on the underside thereof. These sensors may each comprise a tube that is operatively connected to a transducer element, the tube having one or more openings that are spaced from the transducer element. Each opening faces away from the direction of the air and the crop flow, such that is not prone to clogging by the crop particles. Alternatively, the tube may be integrated into the base of one of the louvres such that it does not hinder the passage of crop material between the two sieves 11, 12.

Four further pressure sensors in the form of left and right pitot tubes 17e, 17f and left and right fan pressure sensors 17g, 17h, are located towards the lowermost part of the grain cleaner adjacent the fan itself. The openings of these pitot tubes also face away from the direction of the air flow to preclude clogging.

Other arrangements of the pressure sensors are possible within the scope of the invention. The precise configuration shown has been found, through experimentation and research, to suit one particular class of combine harvester in common use.

The or each of the pressure sensors 17 generates one or more signals (as signified by arrows in FIGS. 2A and 2B) that are related to the pressure of air in the vicinity of the biomass.

In use of the combine harvester the signals are transmitted to one of the control devices of the combine harvester that is suitably programmed to derive therefrom further signals indicative of the sieve losses and/or the MOG content of the biomass during sieving.

As indicated above, deriving MOG content and sieve loss data from pressure signals has been found advantageously to provide the basis for a fast and accurate control regime for the adjustable parts (sieve openings, fan speed) of a combine harvester grain cleaner.

As a result the quality of grain conveyed via the clean grain elevator (that is of a conventional kind encountered in a grain cleaner) to the grain tank is significantly improved compared with the prior art. Therefore the apparatus of the invention in an unexpected way solves one of the primary problems extant in prior art grain cleaners.

The method of operation of the apparatus shown in FIG. 2 is described hereinbelow with reference to FIGS. 3 to 6.

Based on experimental results derived from one particular combine harvester, it was established that very useful results for predicting the total sieve losses (sieve overload+kernels which are blown out by the fan) and the MOG content in the grain tank were obtained by making use of the pressure sensors 17a, 17b, 17c and 17d (FIG. 2B) under the upper sieve section. Because of the orientation of the openings of the sensor tubes these pressure sensors measure the difference between the static pressure and the dynamic pressure, giving rise to the expression $$P_{raw} = P_{static} - P_{dynamic}$$

The raw signal of these sensors ($P_{raw}$) is influenced by the amount of incoming biomass and also by the settings of the cleaning section (including fan speed; and lower and upper sieve opening). In order to make these pressure signals only dependent on the amount of crop material on the sieve section and independent of the cleaning section settings, a new correction algorithm was proposed.

Figure 3:
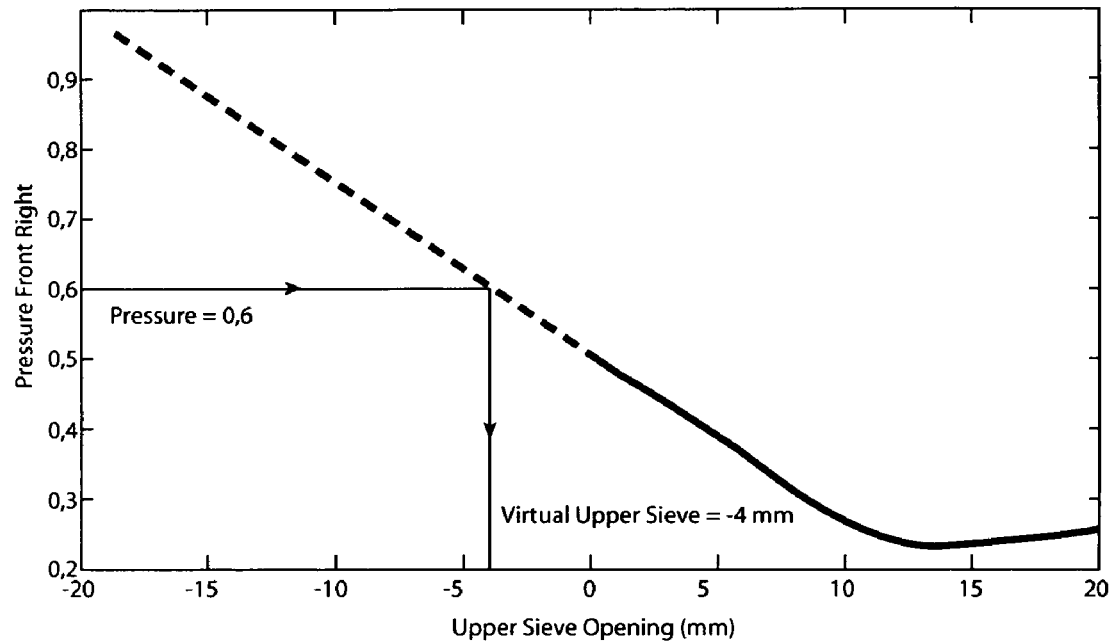
FIG. 3 represents in graphical form data used in calibrating a biomass cleaner in accordance with the invention.

At a first stage, the signals of the pressure sensors were measured for calibration purposes when the cleaning section of the combine harvester had a zero load of biomass. These calibration signals were measured for different combinations of fan speed, and lower and upper sieve openings. As a result, a typical calibration curve was established for the relationship between the upper sieve openings and the pressure sensor signals for each combination of lower sieve opening and fan speed. An example of such a calibration curve is shown in FIG. 3. In FIG. 3 the calibration curve shows the relationship between the upper sieve opening and the pressure measured by the sensor which is placed at the front right section of the upper sieve, when the fan speed was set at 800 rpm and the lower sieve opening was set at 8 mm. The solid (non-dotted) line indicates the points which are physically measurable on the machine by changing the upper sieve opening between 0 and its maximum opening. Reducing the upper sieve opening resulted in an increase of the static pressure and a decrease of the dynamic pressure. The total pressure, $P_{raw} = P_{static} - P_{dynamic}$, measured by the pressure sensors as a result increased. The dotted line in the left-hand half of the graph indicates the extrapolation of the linear part of the solid line calibration curve. When the cleaning section of the combine harvester is loaded with grain, chaff and straw, this can be interpreted as reducing the size of the holes on the upper sieve section. An increase of the amount of biomass on the upper sieve section can be simulated by decreasing the upper sieve opening. Because the upper sieve openings could be only physically changed between 0 and 20 mm in the particular combine harvester investigated, an extrapolation of the measured solid line curve was needed in the negative direction in order to cover pressure ranges above the pressure obtained with a fully closed sieve louvres.

When the combine harvester is loaded with grain, chaff and straw, the raw pressure sensor signal $P_{raw}$ is measured and the corresponding 'virtual upper sieve opening' (i.e. a sieve opening equivalence) is searched by making use of the calibration curve for the set fan speed and lower sieve opening. This curve is taken from the database of calibration curves resulting from experimental investigations of the kind outlined above. The 'virtual upper sieve opening' is the upper sieve opening that corresponds to the measured pressure signal and can thus be negative. Then the virtual upper sieve opening is subtracted from the real upper sieve opening. The difference L can be interpreted as a measure of the biomass load on the upper sieve section. In terms of such an interpretation when carried out by e.g. a microprocessor it does not matter, computationally, that the sieve opening value may be negative. For a given pressure $P_{raw}$, the sieve load L will be smaller if the upper sieve opening is small and greater if the opening is great.

Results of field tests confirmed that this estimator for the loadings on the upper sieve section is a good predictor of the sieve losses and MOG content in the grain tank. The actual relationship between the sieve load estimator L and the sieve losses and MOG can be established by monitoring the evolution of the estimator values and the concurrent sieve losses and MOG contents. The latter variables are measured by the sieve loss sensor at the rear of the biomass cleaner and the MOG sensor on the clean grain elevator. These data are collected at a slower rate than the pressure data. When the data relate to a stationary operation of the harvester, these data can be used for establishing and/or adjusting the curves representing the relationship between the sieve load estimator L on the one hand and the sieve losses and the MOG content on the other hand.

Instead of using a sieve load estimator L as described above, it is also possible to use a corrected pressure signal as an indicator of the sieve load. The measured pressure signal $P_{raw}$ is in that case corrected by subtracting from it a pressure value established in advance for the given fan speed and dimensions of the upper and lower sieve openings, and to divide the difference by a given gain factor. This corrected pressure signal $P_{corr}$ is useful for harvesting conditions that show little variation, but the inventive sieve load estimator L proved better for a wider range of harvesting conditions and crop types.

One might say that the aim in designing a control philosophy using calibration results as described hereinabove is to achieve an optimum between acceptable sieve losses and return volume for a desired level of MOG in the grain tank and a certain amount of incoming biomass.

Figure 5:
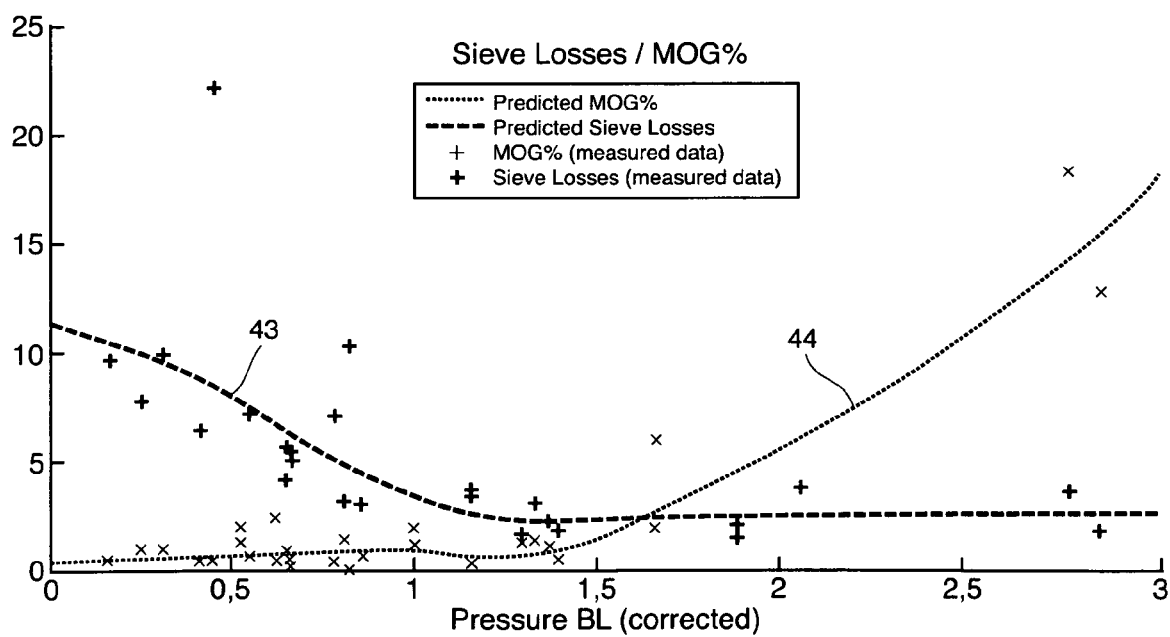
FIG. 5 shows in graphical form a typical relationship between MOG content in the clean grain path, sieve losses and measured air pressure in a grain cleaner as shown in FIG. 2.
Figure 4:
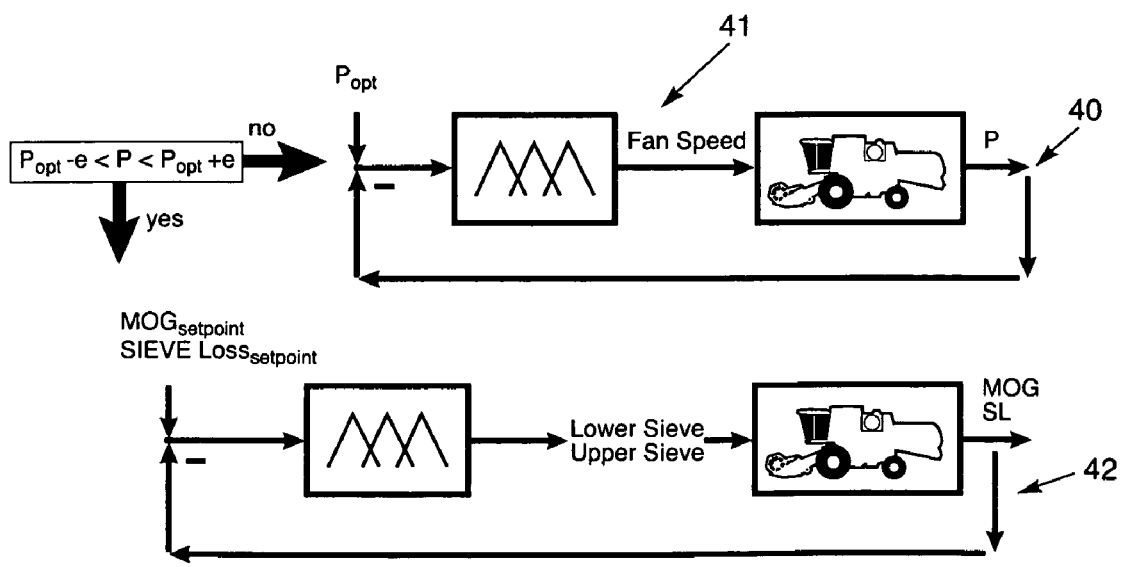
FIG. 4 shows in schematic form one form of control arrangement of a grain cleaner as depicted in FIG. 2.

One form of programmable control device, according to the invention, is a fuzzy controller 40 as shown in FIG. 4. Such a controller, which in preferred embodiments of the invention is constructed as a programmed device such as a microprocessor, comprises two main controller loops (i.e. a fast loop 41 and a slow loop 42) and makes use of the sieve load estimator L, viz. $P_{corr}$, derived from the pressure signal. During operation of the apparatus of the invention, both control loops may be activated simultaneously. A distinction should be made between the fast loop 41 (cycle time of 10 sec) which regulates the fan speed and the slow loop 42 which regulates the lower and upper sieve opening (cycle time of 50 sec). The fast loop is a state-feedback control loop. The loops are themselves conventional feedback control loops, although their gain terms may be based on non-linear models relating the sieve load estimator or corrected pressure signal and respectively the MOG content in the grain tank and the sieve losses (FIG. 5). These variables are shown graphically in FIG. 5, in which predicted percentages of grain loss and MOG, respectively, are plotted against the aforesaid load estimator or corrected pressure signal that has been calculated according to the steps set out above. Line 43 of FIG. 5 is the sieve loss plot, and line 44 the MOG plot.

In use, the programmable control device (which is represented schematically e.g. in FIG. 4) calculates the optimal load estimator setpoint $L_{opt}$, viz. $P_{opt}$, based on the desired MOG content in the grain tank and sieve loss level. As already reported, the optimal setpoint for MOG and sieve losses can differ from operator to operator. One operator might pay a lot of attention to the cleanliness of his grain sample while another driver might want to reduce the sieve losses and is not concerned about the MOG content in his grain tank. Also, a combine harvester driver may also be motivated by some economic reasoning and will choose an economical optimal setpoint which depends on the grain prices and the penalties he receives when delivering grain samples with too many impurities at a grain station. As a result, a cost function can be defined and an optimal setpoint for the load estimator can be established by making use of quadratic optimization techniques with constraints such as an active set method. Other ways of establishing the setpoint are possible within the scope of normal use of the apparatus of the invention.

Once the optimal setpoint for MOG and sieve losses is calculated, the programmable control device will check if the value of the load estimator L, viz. $P_{corr}$, lies in the interval around the corresponding optimal load value [e.g., $P_{opt}$–error, $P_{opt}$+error]. The optimal load value $L_{opt}$, viz. $P_{opt}$, is calculated based on the non-linear model of FIG. 5, and the setpoints for MOG and sieve losses. If the actual load estimator value is outside this range, the fast loop 41 of the programmable device will be activated and the fan speed will be changed based on fuzzy heuristic "if-then" rules until the corrected pressure lies in the optimal range (i.e. a state-feedback controller). In the fast loop 41, only the fan speed will be changed because the fan speed has the major effect on the pressure $P_{raw}$ and thus the MOG content and sieve losses. Because of the stochastic relationship between the sieve load estimator (state) and the output of the process (respectively, MOG content in the grain tank and sieve losses), it may be impossible that the model-based state-feedback controller will reach the optimal setpoint for MOG and sieve losses. However, by making use of a fast measurable state predictor (sieve load estimator L or corrected pressure $P_{corr}$) for MOG and sieve losses, the setpoint intervals [$MOG_{opt}$–error, $MOG_{opt}$+error]; [$SieveLoss_{opt}$–error, $SieveLoss_{opt}$+error] can be reached in a short time period by changing the fan speed.

Once the measured pressure lies in the interval [e.g., $P_{opt}$–error, $P_{opt}$+error], the slow control loop 42 will activate to manage the fine-tuning of the upper and lower sieves 11, 12 in order to reach $MOG_{opt}$ and $SieveLoss_{opt}$ by making use of a fuzzy "if-then" rule base with (as input) the feedback of the process outputs (MOG, Sieve Losses) and a state variable (the amount of return flow). The MOG content is measured by the MOG sensor on the clean grain elevator. The sieve loss is measured by the conventional sieve loss sensor at the end of the biomass cleaner. The return flow rate is also measured by a conventional sensor in the return flow path. An overview of the fuzzy rule base used in one exemplary combine harvester can be found in Table 1.

Because of the variability of crop heights, densities and other crop and non-crop characteristics between different fields and within the same field, the relationship between the sieve load estimator L or corrected pressure $P_{corr}$ and respectively MOG and sieve losses is highly variable. Therefore, a recursive estimator contained in the software of the programmable device automatically tunes this relationship "on-the-go" in the field. The overall architecture of the control system is shown in FIG. 6.

TABLE 1

Fuzzy rule base of the slow control loop of an exemplary combine harvester

| MOG | Sieve Losses | Return Flow | Lower Sieve | Upper Sieve |
| --- | --- | --- | --- | --- |
| Too Low | OK | OK | No change | Open 2 steps |
| Too Low | OK | High | Open 1 step | No change |
| Too Low | OK | Very High | Open 2 steps | No change |
| Too Low | High | OK | No change | Open 1 step |
| Too Low | High | High | Open 1 step | Open 1 step |
| Too Low | High | Very High | Open 2 steps | Open 1 step |
| Too Low | High | OK | No change | Open 2 steps |
| Too Low | High | High | Open 1 step | Open 2 steps |
| Too Low | High | Very High | Open 2 steps | Open 2 steps |
| Low | OK | OK | No change | Open 1 step |
| Low | OK | High | Open 1 step | No change |
| Low | OK | Very High | Open 2 steps | No change |
| Low | High | OK | No change | Open 1 step |
| Low | High | High | Open 1 step | Open 1 step |
| Low | High | Very High | Open 2 steps | Open 1 step |
| Low | High | OK | No change | Open 2 steps |
| Low | High | High | Open 1 step | Open 2 steps |
| Low | High | Very High | Open 2 steps | Open 2 steps |
| OK | OK | OK | No change | No change |
| OK | OK | High | Open 1 step | No change |
| OK | OK | Very High | Open 2 steps | No change |
| OK | High | OK | No change | Open 1 step |
| OK | High | High | Open 1 step | Open 1 step |
| OK | High | Very High | Open 2 steps | Open 1 step |

TABLE 1-continued

Fuzzy rule base of the slow control loop of an exemplary combine harvester

| MOG | Sieve Losses | Return Flow | Lower Sieve | Upper Sieve |
|---|---|---|---|---|
| OK | High | OK | No change | Open 2 steps |
| OK | High | High | Open 1 step | Open 2 steps |
| OK | High | Very High | Open 2 steps | Open 2 steps |
| High | OK | OK | Close 1 step | No change |
| High | OK | High | Close 1 step | Close 1 step |
| High | OK | Very High | Close 1 step | Close 2 steps |
| High | High | OK | Close 1 step | Open 1 step |
| High | High | High | Open 1 step | Open 1 step |
| High | High | Very High | Open 2 steps | Open 1 step |
| High | High | OK | Close 1 step | Open 2 steps |
| High | High | High | Open 1 step | Open 2 steps |
| High | High | Very High | Open 2 steps | Open 2 steps |
| Too High | OK | OK | Close 2 steps | No change |
| Too High | OK | High | Open 1 step | Close 1 step |
| Too High | OK | Very High | Open 2 steps | Close 2 steps |
| Too High | High | OK | Close 2 steps | Open 1 step |
| Too High | High | High | Open 1 step | Open 1 step |
| Too High | High | Very High | Open 2 steps | Open 1 step |
| Too High | High | OK | Close 2 steps | Open 2 steps |
| Too High | High | High | Open 1 step | Open 2 steps |
| Too High | High | Very High | Open 2 steps | Open 2 steps |

Figure 7:
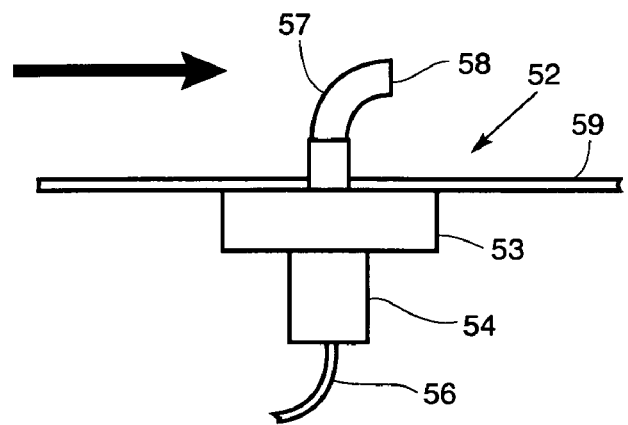
FIG. 7 shows one form of pressure sensor that is suitable for use in a harvesting machine according to the invention.

A typical air pressure sensor 52 for use in accordance with the invention is shown in FIG. 7.

Sensor 52 includes a transducing element 53 that is capable of generating an electrical signal in proportion to the air pressure sensed. The transducing element 53 is connected by way of a connector 54 and cable 56 to provide an input to the fuzzy model embodied in the controller of the combine harvester.

The transducing element 53 is connected to ambient air pressure in the cleaning mechanism by way of a tube 57 that at one end connects directly to the transducing element; and at the other end is open, as signified by reference numeral 58.

Tube 57 is cranked through 90° and protrudes upwardly from a mounting plate 59. The cranking of the tube 57 is such as to present the opening 58 in a direction facing away from the direction of material flow in the combine harvester cleaning mechanism, as signified by the arrow in FIG. 7. Such an arrangement minimises the risk of plugging or clogging of the tube 57.

In summary therefore a biomass cleaner in accordance with the invention adopts a novel control approach based on the use of pressure sensor signals to determine sieve loss and/or MOG content values. As noted, the accuracy of a control scheme based on such an approach is better than in prior art arrangements.

Apparatus according to the invention includes a programmable control device that firstly processes the measured pressure signal; and then operates one of two control loops programmed in its software, being the fast 41 and slow 42 loops described above.

Thus overall the apparatus of the invention and use thereof, for the first time, permit practical improvements in the control of e.g. a combine harvester grain cleaner based on more accurate modelling than has hitherto been possible.

The invention claimed is:

1. A biomass cleaner, of a harvesting machine, comprising at least a first sieve for sieving biomass and having one or more first sieve apertures that are openable and closeable in dependence on control commands; an air fan the speed of which is adjustable in dependence on control commands; and at least one control device that generates the control commands, the first sieve defining a support for biomass that is sieveable via the sieve; and the biomass cleaner including one or more pressure sensors for generating one or more signals that are related to a pressure of air in the vicinity of the biomass, wherein at least one pressure sensor is operatively connected to supply the signals to the at least one control device that derives therefrom sieve load signals indicative of the amount of biomass on the first sieve and derives from sieve load signals estimates of sieve losses and Material Other than Grain content of cleaned biomass, during operation of the cleaner, wherein the at least one control device is programmed to compare the pressure sensor signal with a range of pressures corresponding to first sieve aperture opening values, to determine therefrom a first sieve opening equivalence, and to establish the difference between a degree of opening of the first sieve aperture on the one hand and the first sieve opening equivalence on the other, the at least one control device derives the sieve load signals from the difference.

2. A biomass cleaner according to claim 1 wherein the pressure sensor lies below the first sieve.

3. A biomass cleaner according to claim 1 wherein the first sieve is rectangular in plan and the pressure sensor lies adjacent a corner thereof.

4. A biomass cleaner according to claim 3 wherein the pressure sensor is adjacent to each corner of the first sieve.

5. A biomass cleaner according claim 1 wherein the at least one control device generates the control commands for adjusting the degree of opening of the first sieve apertures in dependence on at least one of the estimates of the sieve losses and the estimates of the Material Other than Grain content of the cleaned biomass.

6. A biomass cleaner according to claim 1 wherein the at least one control device generates the control commands for adjusting the speed of the fan in dependence on the sieve load signals.

7. A biomass cleaner according to claim 1 including a further sieve having one or more further sieve apertures that are openable and closeable in dependence on further control commands, the further sieve being located to sieve biomass that is ejected from the first sieve; and the biomass cleaner including the at least one control device that generates the further control commands and are operatively connected to do so.

8. A biomass cleaner according to claim 7 wherein in use the further sieve lies below the first sieve such that during sieving biomass falls under gravity from the first sieve to the further sieve.

9. A biomass cleaner according to claim 1 wherein the pressure sensor is arranged to measure the difference between static air pressure and dynamic air pressure in the biomass cleaner and produces a pressure signal that is related to the said difference.

10. A biomass cleaner according to claim 1 wherein the at least one control device includes a memory having stored therein one or more pressure calibration data sets that are characteristic of the biomass cleaner and include plural values of first sieve opening equivalence; and wherein the at least one control device is programmed to generate the sieve load signal by comparison with one or more said calibration data sets.

11. A biomass cleaner according to claim 1 wherein the at least one control device defines two control loops a first of which is a relatively fast control loop that controls the adjustment of the speed of the air fan; and the second of which is a relatively slow control loop that controls a degree of opening of at least the first sieve apertures.

12. A biomass cleaner according to claim 11 wherein the second, relatively slow control loop additionally controls the degree of opening of a further sieve aperture.

13. A biomass cleaner according to claim 11 wherein the relatively fast control loop is or includes a feedback loop the gain expression of which is non-linear and that relates the sieve load signal, an instantaneously prevailing value of the Material Other than Grain content of the biomass and an instantaneously prevailing value of the sieve losses in the biomass cleaner.

14. A biomass cleaner according to claim 11 wherein the at least one control device is programmed to operate the relatively fast control loop when the corrected pressure signal lies outside a predetermined range of values.

15. A biomass cleaner according to claim 11 wherein the second, relatively slow control loop includes a linear feedback loop, set points of which are predetermined values of the Material Other than Grain content of the biomass and of the sieve losses in the biomass cleaner.

16. A biomass cleaner according to claim 11 wherein the at least one control device is programmed to include a recursive estimator relating values of the sieve load signal, a value of the Material Other than Grain content of the biomass and a value of sieve losses in the biomass cleaner so as to take account of variations in biomass conditions.

17. A biomass cleaner according to claim 1, when configured as the grain cleaner of a combine harvester.

18. A biomass cleaner according to claim 1 forming part of a crop harvesting machine that includes a sensor for sensing Material Other than Grain in the cleaned biomass.

19. A biomass cleaner according to claim 1 wherein the harvesting machine includes at least one air pressure sensor located at least on one of the following: a top outlet of a cleaning mechanism fan; a bottom outlet of a cleaning mechanism fan; under one or more sieve areas of a cleaning mechanism; or adjacent a tailings conveyor of a combine harvester.

20. A biomass cleaner according to claim 19 wherein the pressure sensor includes a transducer element that is operatively connected to at least one control device; and a tube that is operatively connected to the transducer element, the tube being open at an opening that is spaced from the transducer element.

21. A biomass cleaner according to claim 20 wherein the opening faces away from an in-use upstream end of the cleaning mechanism.

22. A biomass cleaner according to claim 21 wherein the tube bends through approximately 90° from one end to the other.

23. A biomass cleaner according to claim 20 wherein the tube extends generally parallel to a louvre of the sieve of the cleaning mechanism.

24. A biomass cleaner according to claim 20 wherein the tube is incorporated into a louvre of the sieve of the cleaning mechanism.

25. A biomass cleaner according to claim 19 including one or more air velocity sensors located at least one of the following: a top outlet of a cleaning mechanism fan; a bottom outlet of a cleaning mechanism fan; under one or more sieve areas of a cleaning mechanism; or adjacent a tailings conveyor of the harvesting machine, the air velocity sensor being capable of generating one or more signals that are each indicative of a velocity of air in its vicinity and being operatively connected to at least one control device.

26. A biomass cleaner according to claim 1 wherein the harvesting machine includes one or more load cells each secured to a grain pan, the or each load cell being capable of generating one or more signals that are each indicative of a instantaneously prevailing load of grain on the associated grain pan during operation of the harvesting machine; the or each load cell being operatively connected to at least one control device; and the or each said control device being capable of deriving the sieve loss and/or Material Other than Grain estimate from the or each load cell signal.

27. A biomass cleaner according to claim 1 including a grain flow sensor located and configured to generate one or more signals that are each indicative of a proportion of returned grain at a tailings conveyor of the crop harvesting machine, the grain flow sensor being operatively connected to the at least one control device.

* * * * *